Feb. 3, 1942.  S. PALOS  2,271,569
ELECTROCUTING TRAP
Filed Jan. 10, 1940  2 Sheets-Sheet 1
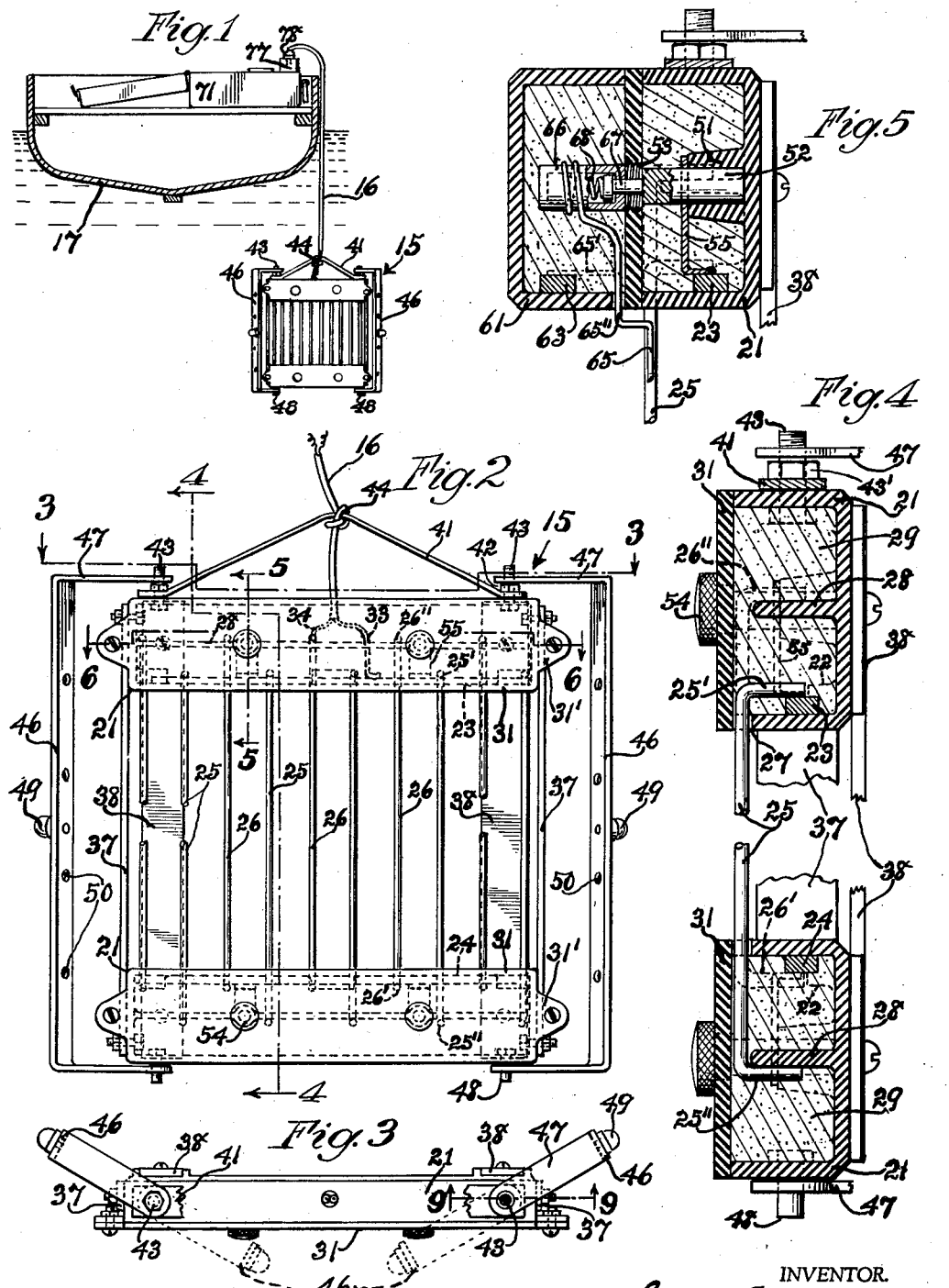
INVENTOR.
Sam Palos
BY J. Daniel Stuwe
ATTORNEY.

Feb. 3, 1942. S. PALOS 2,271,569
ELECTROCUTING TRAP
Filed Jan. 10, 1940 2 Sheets-Sheet 2
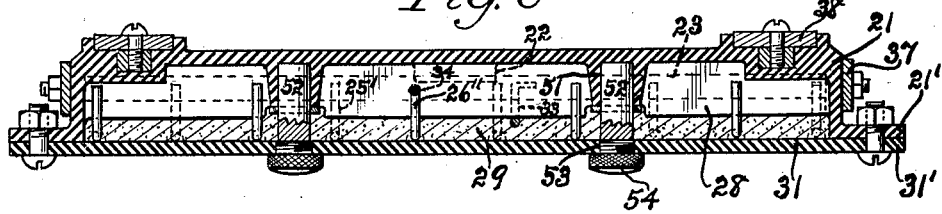
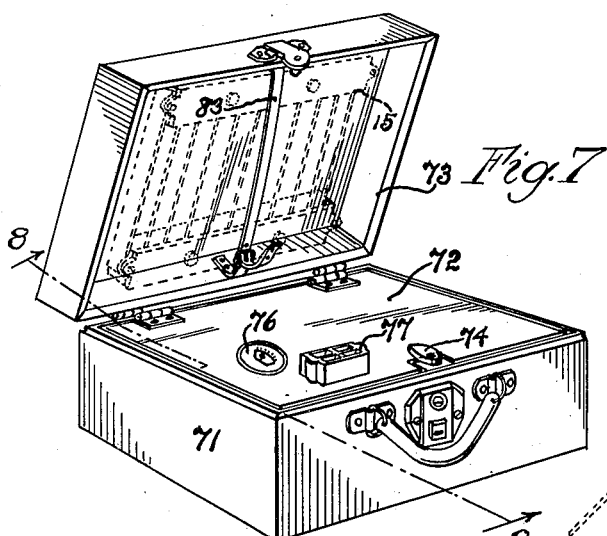
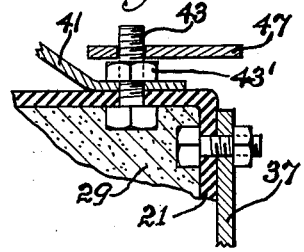
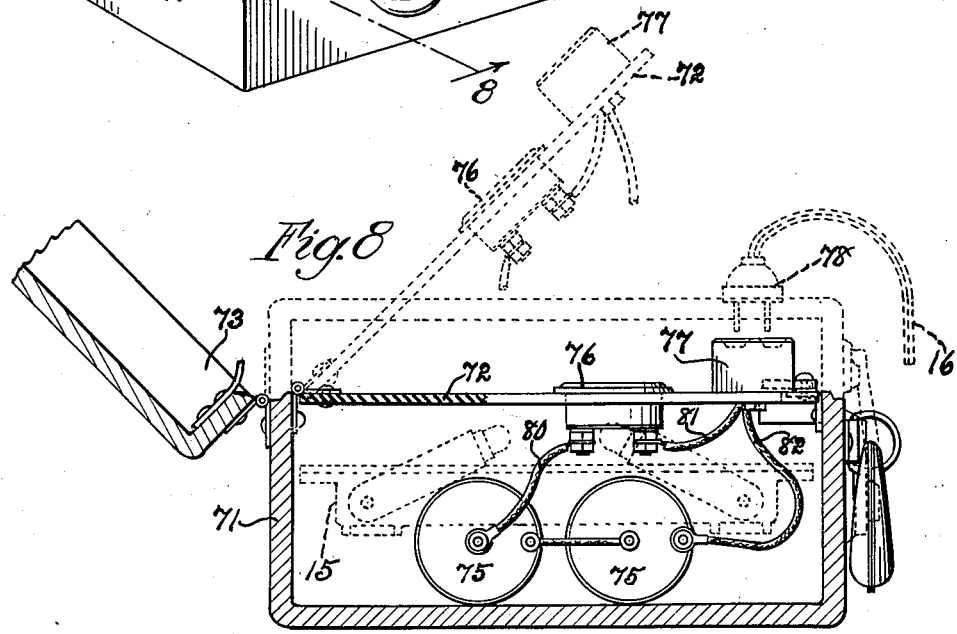
Inventor
Sam Palos
by J. Daniel Stuwe
Attorney Patented Feb. 3, 1942

2,271,569

UNITED STATES PATENT OFFICE 2,271,569

ELECTROCUTING TRAP

Sam Palos, Argo, Ill.

Application January 10, 1940, Serial No. 313,225

4 Claims. (Cl. 43—98)

This invention relates to new and useful improvements in an electrocuting trap.

One of the objects of this invention is to provide an improved and economical trap structure which comprises spaced electrodes forming an open electric circuit adapted to be closed by an animal when it comes in contact therewith, so as to electrocute the animal.

A more particular object of this invention is to provide such an electrocuting trap which is especially adapted to be suspended in the water for catching fish, and is provided with means thereon adapted to swing or converge, so that when a fish or animal contacts this trap said means will be caused to move and to converge toward the same, tending to drive it into intimate contact with the electrodes for more certainly electrocuting and holding the fish or other animal.

Another object of this invention is to provide such an electrocuting trap which is equipped with light reflecting means thereon tending to attract the fish into contact with this trap.

A further object of this invention is to arrange the construction of this trap so that, whenever it may become desirable, it is adapted to have a secondary grid structure attached thereto, thereby providing smaller spaces between the adjacent electrodes and adapting the trap for catching small animals and insects, as has been more fully disclosed and claimed in my prior application for patent for Electrocuting trap, Serial No. 240,275, filed November 14, 1938. Said prior application matured into Patent No. 2,187,400 on January 16, 1940.

Another object of this invention is to provide in conjunction herewith an appropriate casing means which is adapted to house the trap for conveniently carrying the same, and which casing means is furthermore provided with ammeter means and with battery means and with detachable plug-in means for conveniently connecting the electric conductor of the trap to said ammeter and battery means while the trap is being suspended in its operative position.

These and various other objects and advantages are attained with this invention, as will become apparent from the following description, taken in connection with the accompanying drawings illustrating this invention in its preferred form of construction, it being evident that various other forms and modifications may be adopted for carrying out the objects and purposes of this invention.

In the drawings:

Fig. 1 represents a cross-sectional view of a boat with my electrocuting trap suspended therefrom in the water, to be utilized as a fishing trap, and the view also illustrates suitable electric connections between the trap and a source of electric current supply in the boat.

Fig. 2 is an elevational view of the trap while in its suspended position, with parts broken away.

Fig. 3 is a view looking down on the suspended trap, being partly broken away and partly in section, taken on line 3—3 of Fig. 2.

Fig. 4 is an enlarged cross-sectional view, taken on line 4—4 of Fig. 2, and being medially broken away.

Fig. 5 is an enlarged cross-sectional view thru one of the frame members, taken substantially on line 5—5 of Fig. 2, but in addition illustrating how a secondary grid structure can optionally be mounted thereon and utilized therewith, like in my above identified application.

Fig. 6 is an enlarged sectional view longitudinally of the frame member, taken on line 6—6 of Fig. 2.

Fig. 7 is a perspective view of a casing or grip adapted for housing and carrying the trap therein while idle, and also housing suitable battery means, and being equipped with a panel carrying an ammeter and a plug-in terminal thereon for connecting thereto the conductor which extends from the trap and whereby the trap is suspended during operation.

Fig. 8 is an enlarged sectional view thru said casing, taken on line 8—8 of Fig. 7.

Fig. 9 is an enlarged detail sectional view, taken on line 9—9 of Fig. 3.

This application discloses my present invention in its preferred form of construction, which comprises a trap 15 made of suitable shape and size and being adapted for catching animals of various kinds and sizes. It is shown in the drawings as being more particularly adapted for catching fish, and thus is shown as immersed in the water and suspended by means of a relatively strong conductor 16 depending from a boat 17 which may be utilized for fishing purposes.

The trap structure of this form illustrated herein comprises a pair of spaced frame members 21 which are preferably made alike and are of insulating material, being oblong and preferably channel-shaped. Each member has ledge means 22 therein providing shelf or niche means for supporting thereon one of the pair of terminal members 23 and 24, each of which is preferably in the form of a bus bar extending longitudinally of the frame member and being of brass or other suitable conductive material.

These two frame members 21 are connected by two sets of electrodes 25 and 26 which are disposed alternately between said members, and are preferably in the form of rods or wires of conductive material. The alternate electrodes 25, of one set, have each a bent end 25' secured to the terminal member 23, and the alternate electrodes 26, of the other set, likewise have each a bent end 26' secured to the terminal member or bar 24, by means of solder or welding of the like.

Each of the members 21 is provided with notches 27 at the upper edges of its channels, for receiving therein the electrode wires 25 and 26; and it is also provided with rib means 28 of insulating material and preferably integral therein, extending longitudinally centrally of each member 21; while the electrode wires 25 and 26 have at their opposite unsecured ends down-turned end portions 25'' and 26'' respectively, which are engaged or hooked over said rib means 28. This provides for conveniently installing the electrode wires and supporting them on the frame members.

Packing means 29 of insulating material is packed in the channel members 21, and it is preferably inserted therein in a semi-plastic condition. It serves to firmly embed all of said bent ends of the various electrode wires, and also said pair of terminal bars, within the channel members and to hold them securely in place therein; and said packing further serves to retain these parts sealed therein and thus adapt this device for immersion in the water, for catching fish and other aquatic animals.

A cover plate 31 of insulating material is mounted upon each channel-shaped frame member, and is secured at its ends 31' upon the ends 21' of said member 21, by means of threaded elements or the like, thus securing the packing means and parts in the frame member.

As best shown in Fig. 2, the conductor 16 has the lower end portions 33 and 34 of its lead wires electrically connected with the terminal members 23 and 24, respectively; and said end portions may be directly secured to said members, by means of solder or the like, these members 23 and 24 thus providing the positive and the negative terminal means of the trap.

The frame members 21 with the terminal members 23 and 24 therein, and the electrodes 25 and 26 connecting the same, are arranged in the form of a grid structure; while straps 37 and 39 are preferably used, which have their ends secured to the end parts of frame members 21, for reinforcing this structure.

A supporting member, in the form of an arched bar 41, has its ends 42 secured to the frame, as by means of bolts 43 extending from the upper frame member 21 and nuts 43' secured thereon; while the conductor 16 is tied or knotted at 44 around the bight portion of said arched member 41. Hence, since the covering material of conductor 16 is relatively strong, the trap is safely supported in its operative position, with the lower part of the conductor left slack to avoid any accidental tearing or detaching of said end portions 33 and 34 of conductor 16 away from the terminal members 23 and 24 while the trap is suspended.

This form of construction is furthermore provided with swingable means 46 mounted at the opposite parts of the trap, adapted to move freely on the two sides of the trap, as indicated in Fig. 3, so that whenever a fish or other animal hits or bears against either face of the trap this means 46 will be swung automatically toward the outer part of the fish or animal, and will thereby tend to drive it into close contact with the electrodes and to hold it in place thereon. Said means is preferably in the shape of a pair of yoke members, each having its two ends 47 pivotally mounted on the frame members 21, as by means of a screw or bolt 48 protruding from the lower member, and by one of the bolts 43 on the upper member. Said yokes are slightly resilient to have the ends 47 flexed and sprung in place on the bolts 43 and 48, which adapts these yokes 46 to swing freely on the grid structure, and to be readily removed therefrom when not required.

Light reflecting means 49 is preferably also provided on each yoke member 46, which may consist of glass knobs secured to the yokes and being adapted to shine or to reflect light and aid in attracting fish and other animals to this trap. Openings 50 are also provided on each yoke adapted for attaching fish hooks thereto.

This device may also be arranged so as to optionally combine therewith a secondary grid structure, to furnish additional electrodes more closely spaced, for use in catching small animals and insects, in a manner like that set forth and claimed in my prior application above referred to. For that purpose the frame member 21 has an integral sleeve 51 provided therein, adapted to receive a contact pin 52 of conductive material; and the cover plate 31 has an opening 53 therein, which is normally closed by a screw plug 54; while a connecting link 55 electrically connects said pin 52 with the respective bus bar or terminal member 23 or 24 in said frame member.

As illustrated in Fig. 5, such secondary grid structure is similar to the main structure described above, and includes frame members 61 which are mounted inverted on the frame members 21, each containing a terminal member or bus bar 63 therein. To each bar 63 the electrodes 65 of one of the two secondary sets of alternate electrodes are connected, each by a bent end portion 65', so that the secondary electrodes lie in the plane of the main electrodes, like in my prior form above identified.

Tubular members 66 are mounted in the frame members 61, each having a contact pin 67 yieldably mounted therein by means of a spring 68; while an electrode 65 of each secondary set has an extension or end portion 65'' connected to or wound around a tubular member 66. Said pin 67 is thereby adapted to make electric contact with pin 52 in frame member 21, to provide and maintain a floating and constant contact between bar 23 of this improved grid and one of the bars 63 of the optionally usable secondary grid.

As such secondary grid structure, in combination with a primary grid structure, has been described and claimed in my above identified application, it is believed not necessary to describe the same further in this application.

I also provide means with this invention which is adapted to house the trap and the associated members therein, for conveniently carrying the same about. This means is illustrated herein in the form of a casing or grip 71 which is provided with a hinged panel 72, adjacent the hinged cover 73, while a latch 74 is adapted to hold the panel in its closed position. Said casing has room below said panel for conveniently housing suitable battery means 75 therein, if desired.

The panel 72 carries thereon an ammeter 76, and also a plug-in connection or terminal 77 which is adapted to have attached thereto the terminal plug 78 provided on the upper end of conductor 16 of the trap, when the trap is put in operation.

Suitable electric conductors 80, 81 and 82 are used to connect the battery 75, the ammeter 76 and the terminal 77, for connecting them in series with the trap when that is plugged in for operative use.

By way of illustration, the battery means 75 is shown herein as the source of electric current supply, and it is of the required voltage; but the conductor wires 80 and 82 may likewise be connected to a battery of the fishing boat, or to the battery terminals of an automobile located on the shore.

As indicated in Fig. 7, the trap may have the pair of yokes 46 and the supporting member 41 detached therefrom, whenever this trap is to have the secondary set of electrodes and grid combined herewith, for use outside of the water in catching small animals and insects.

The casing 71 has room for housing the trap when not in use. There is room for the trap below the panel 72, as indicated in Fig. 8; and there is also room in the cover 73, above the panel, as indicated in Fig. 7, wherefore a holding strap 83 is provided in the cover.

With this trap placed in operation in the water, it is found that when a fish contacts the electrodes the water will act as a conductor and aid in the electrocution, whereupon the fish will adhere to the electrodes contacted and may thus be brought up by raising the trap. Moreover, when a fish swims against or strikes either face of this trap, the yokes 46 will be caused to swing around the outward part of the fish, thus further tending to drive it more closely against the electrodes of this trap.

It is evident from the above disclosure that this construction provides an improved trap, which is especially suitable for catching fish, and is also adapted for catching other animals, either in the water or out of the water, as may be found desirable.

I claim:

1. An electrocuting trap comprising a pair of spaced frame members carrying oppositely charged terminal bars therein, a plurality of spaced electrodes whereof the alternate ones have one end connected to a bar in one of said frame members and the other end mounted with insulating means in the opposite frame member, an arched supporting member having its two ends secured on the upper part of the frame members, and a flexible conductor which has a water-proof exterior covering and contains a pair of electric wires which have their ends connected to said terminal bars, said conductor with its wires and covering being tied in a knot around the arched member for supporting the trap suspended in the water, with the lower part of the conductor left slack to avoid detaching of its wire ends from the terminal bars.

2. An electrocuting trap comprising a pair of spaced channel-shaped frame members each containing a bottom wall, a pair of side walls, a central rib extending from said bottom wall, and a ledge at the junction of the bottom wall and one of the side walls, all being of insulating material, a pair of oppositely charged terminal bars of conductive material mounted on said ledges, a plurality of spaced electrodes which have bent ends and are alternately connected to one of the terminal bars with one end and supported on an insulating rib with the other end, providing a grid structure, an electric conductor containing wires each having an end connected with one of said bars, and insulating material packed airtight in the channels of the frame members, for securing the bars and the electrode ends waterproof in place therein.

3. The subject matter set forth in claim 2, wherein each of the frame members contains an insulating sleeve therein provided with a pin of conductive material, and means connecting said pin electrically with one of said terminal bars, to adapt this trap for use with a secondary grid structure.

4. An electrocuting trap comprising a pair of channel-shaped frame members each containing integral central rib means and side ledge means, all of insulating material, a pair of oppositely charged terminal members of conductive material mounted on said ledge means, a plurality of spaced electrodes having down-turned ends and being thereby alternately connected with one end to one of said terminal members and with the other end hooked over and supported on one of said rib means, insulating means packed in the channels of the frame members to secure the terminal members and the electrode ends firmly and water-proof in position, an arched supporting member detachably mounted on the frame members, and a relatively strong conductor having the ends of its conductor wires connected with said terminal members, said conductor being tied in a knot around the arched member with the lower part of the conductor left slack, whereby to support the trap suspended in the water for catching fish.

SAM PALOS.